(12) United States Patent
Fukuda

(10) Patent No.: US 8,233,548 B2
(45) Date of Patent: Jul. 31, 2012

(54) NOISE REDUCTION DEVICE AND NOISE REDUCTION METHOD OF COMPRESSION CODED IMAGE

(75) Inventor: Hideki Fukuda, Nara (JP)

(73) Assignee: Panasonic Corporation, Osaka (JP)

( * ) Notice: Subject to any disclaimer, the term of this patent is extended or adjusted under 35 U.S.C. 154(b) by 1118 days.

(21) Appl. No.: 12/118,549

(22) Filed: May 9, 2008

(65) Prior Publication Data
US 2008/0278631 A1    Nov. 13, 2008

(30) Foreign Application Priority Data

May 9, 2007  (JP) ................................ 2007-124239
May 9, 2007  (JP) ................................ 2007-124240

(51) Int. Cl.
     *H04N 7/12* (2006.01)
(52) U.S. Cl. .................................... 375/240.26; 348/554
(58) Field of Classification Search .................... None
     See application file for complete search history.

(56) References Cited

U.S. PATENT DOCUMENTS

| 6,108,041 | A  * | 8/2000  | Faroudja et al. ............. 348/446 |
| 7,016,415 | B2 * | 3/2006  | Alvarez .................... 375/240.16 |
| 7,050,501 | B2 * | 5/2006  | Alvarez .................... 375/240.16 |
| 7,420,618 | B2 * | 9/2008  | Swartz ........................... 348/554 |
| 7,860,167 | B2 * | 12/2010 | Le Dinh et al. ............ 375/240.2 |
| 7,920,628 | B2 * | 4/2011  | Kojokaro et al. ......... 375/240.16 |
| 7,933,339 | B2 * | 4/2011  | Rodriguez ............... 375/240.29 |
| 2002/0118399 | A1 * | 8/2002 | Estevez et al. ........... 358/426.07 |
| 2004/0008790 | A1 * | 1/2004 | Rodriguez ............... 375/240.26 |
| 2004/0012720 | A1 * | 1/2004 | Alvarez ...................... 348/607 |
| 2004/0017517 | A1 * | 1/2004 | Alvarez ...................... 348/700 |
| 2005/0134735 | A1 * | 6/2005 | Swartz .......................... 348/554 |
| 2006/0050783 | A1 * | 3/2006 | Le Dinh et al. ........... 375/240.2 |
| 2006/0274962 | A1 * | 12/2006 | Chiu ............................ 382/275 |
| 2007/0025447 | A1 * | 2/2007 | Kojokaro et al. ....... 375/240.24 |

FOREIGN PATENT DOCUMENTS

| EP | 1 209 624   | 5/2002  |
| JP | 11-69202    | 3/1999  |
| JP | 2002-238049 | 8/2002  |
| JP | 2003-333370 | 11/2003 |
| JP | 2003-348383 | 12/2003 |
| JP | 2005-150903 | 6/2005  |

OTHER PUBLICATIONS

ISO/IEC 13818-2 (MPEG2 Video), 1995 (E).

* cited by examiner

*Primary Examiner* — Ayaz Sheikh
*Assistant Examiner* — Faiyazkhan Ghafoerkhan
(74) *Attorney, Agent, or Firm* — Wenderoth Lind & Ponack, L.L.P.

(57) ABSTRACT

A noise reduction device includes a two-dimensional noise reducing unit for reducing noise by arithmetic processing within an image, a three-dimensional noise reducing unit for receiving the video signal from the two-dimensional noise reducing unit and reducing noise by arithmetic processing between images, a first noise reduction intensity setting unit for setting noise reduction intensity of the two-dimensional noise reducing unit, and a second noise reduction intensity setting unit for setting noise reduction intensity of the three-dimensional noise reducing unit. The second noise reduction intensity setting unit sets the noise reduction intensity of the three-dimensional noise reducing unit, so that the noise reduction intensity of the three-dimensional noise reducing unit becomes lower as the noise reduction intensity of the two-dimensional noise reducing unit becomes higher.

11 Claims, 6 Drawing Sheets

NOISE REDUCTION DEVICE AND NOISE REDUCTION METHOD OF COMPRESSION CODED IMAGE

BACKGROUND OF THE INVENTION

1. Field of the Invention

The present invention relates to a noise reduction device and a noise reduction method of compression coded video signals.

2. Related Art

In a digital television broadcast, video data of large quantity and high quality can be broadcast in limited transmission capacity by transmitting compressed stream data of video signals which is compression coded in MPEG coding method. Also when recording video signals by DVD recorder or the like, the video signals are once compressed in MPEG coding method and then recorded, so that video signals of high quality may be recorded for a long time (see non-patent document 1). However, for transmitting or recording a larger quantity of video data, it is required to compress and code data at higher compression rate, and thus occurrence of coding noise due to compression and coding cannot be avoided.

Block noise which appears to be block stripes is known well as MPEG coding noise. Further, pulsing noise occurs, which provides rough-textured image caused by temporal difference in coding noise occurring in each image.

Noise reduction methods of MPEG coded image are roughly classified into two-dimensional noise reduction process (2DNR) for reducing plane noise occurring in the image, and three-dimensional noise reduction process (3DNR) for reducing temporal noise occurring between the images.

Specifically, 2DNR is effective for reducing the block noise, and 3DNR is effective for reducing the pulsing noise, and 2DNR and 3DNR are combined to be used for reducing noise.

Noise is basically reduced by a low pass filter for removing high frequency components. However, if uniformly processed by a low pass filter, blurry image may occur in 2DNR, or retained image noise trailing the motion may occur in 3DNR, and these are adaptively processed by filtering.

As an example of adaptive process, it has been proposed to detect the motion amount of the image, and intensify the 3DNR and weaken the 2DNR in a still image which has small motion amount (see, for example, patent document 1).

Further, it has been proposed to reduce the noise while suppressing the occurrence of retained image noise also in an image fast in motion, by detecting the motion amount of the image and the correlation amount between frames, and controlling the 2DNR and 3DNR according to the motion amount and the correlation amount between frames (see, for example, patent document 2).

It has also been proposed to control the intensity of noise reduction filter to be executed before the coding process according on the motion vector detected upon compression coding of the image (see, for example, patent document 3).

In another proposal, synthesizing ratio of the image processed by 2DNR and the image processed by 3DNR is controlled depending on the motion of the image, and in the image of fast motion, the effect of 3DNR is suppressed, while the effect of 2DNR is emphasized (see, for example, patent document 4).

Thus, in the case of 3DNR, it is a general way to detect the motion of the image, intensify the effect of 3DNR when the motion is small, and weaken the effect when the motion is large so that the temporal noise is reduced and the retained image noise is suppressed.

Patent document 1: JP-A-11-69202
Patent document 2: JP-A-2003-348383
Patent document 3: JP-A-2003-333370
Patent document 4: JP-A-2005-150903
Non-patent document 1: ISO/IEC 13818-2 (MPEG2 Video)

The motion is detected by the amount of temporal change of pixel level. As the target image has more high frequency components (sharper image), the level change amount in the image is larger, and hence the temporal level change amount of pixel also increases, so that the motion is more likely to be detected. That is, the image having more high frequency components provides substantially higher motion detection sensitivity. To the contrary, the image having fewer high frequency components (blurry image) has small level change amount in the image, and hence the temporal level change amount is also smaller, so that the motion is less likely to be detected. That is, the image having fewer high frequency components provides substantially lower motion detection sensitivity.

Since 2DNR includes a low pass filter as a basic component, the high frequency components are lost when 2DNR is applied in order to reduce coding noise such as block noise occurring more. Since 3DNR has high motion detection sensitivity to a sharp image having many high frequency components, the adaptive process is done effectively, and the noise can be reduced without causing retained image noise. However, in the image of which high frequency components are lost due to strongly applying of 2DNR, the motion detection sensitivity becomes lower, and thus 3DNR is applied strongly so that the retained image noise is more likely to occur.

Accordingly, when 2DNR is emphasized, the coding noise is reduced more securely, but retained image noise is caused by the subsequent 3DNR process.

SUMMARY OF THE INVENTION

The invention is devised to solve these problems, and it is hence an object thereof to present a device and method of noise reduction, which can apply appropriately 2DNR process and 3DNR process for noise reduction to suppress deterioration of image quality effectively.

In the first aspect of the invention, a noise reduction device for reducing noise of a compression coded video signal is provided. The noise reduction device includes: a two-dimensional noise reducing unit operable to reduce noise by arithmetic processing within an image, a three-dimensional noise reducing unit operable to receive the video signal processed by the two-dimensional noise reducing unit and to reduce noise by arithmetic processing between images, a first noise reduction intensity setting unit operable to set noise reduction intensity of the two-dimensional noise reducing unit, and a second noise reduction intensity setting unit operable to set noise reduction intensity of the three-dimensional noise reducing unit. The second noise reduction intensity setting unit sets the noise reduction intensity of the three-dimensional noise reducing unit, so that the noise reduction intensity of the three-dimensional noise reducing unit becomes lower as the noise reduction intensity of the two-dimensional noise reducing unit becomes higher.

In the second aspect of the invention, a noise reduction method for reducing noise of a compression coded video signal is provided. In the noise reduction method, a two-dimensional noise reducing process for reducing noise is executed by arithmetic processing within an image. Receiving the video signal processed by the two-dimensional noise reducing process, a three-dimensional noise reducing process is executed for reducing noise by arithmetic processing between images. The noise reduction intensity of the three-dimensional noise reducing process is set so that the noise reduction intensity of the three-dimensional noise reducing process becomes lower as the noise reduction intensity of the two-dimensional noise reducing process becomes higher.

According to the invention, when the two-dimensional noise reduction process is emphasized, the intensity of the three-dimensional noise reduction process is lowered. As a result, when much coding noise occurs, the two-dimensional noise reduction process is emphasized to reduce the coding noise effectively, while the intensity of the three-dimensional noise reduction process is lowered, so that retained image noise may be suppressed. When coding noise is less, the intensity of the two-dimensional noise reduction process is lowered to suppress deterioration of high frequency range, while the three-dimensional noise reduction process is emphasized to reduce temporal noise and suppress retained image noise. That is, the invention is capable of appropriately suppressing occurrence of coding noise and retained image noise to prevent the deterioration of image quality more effectively.

DETAILED DESCRIPTION OF THE INVENTION

Preferred embodiments of the invention are described below while referring to the accompanying drawings.

First Embodiment

A noise reduction device of the present embodiment lowers the intensity of three-dimensional noise reduction process (3DNR) when two-dimensional noise reduction process (2DNR) is emphasized, while it increases the intensity of three-dimensional noise reduction process when the intensity of two-dimensional noise reduction process is lowered. As a result, when much coding noise occurs, the coding noise can be reduced effectively, while retained image noise due to three-dimensional noise reduction process can be suppressed. When coding noise is less, retained image noise can be suppressed effectively. The details are described below.

Figure 1:
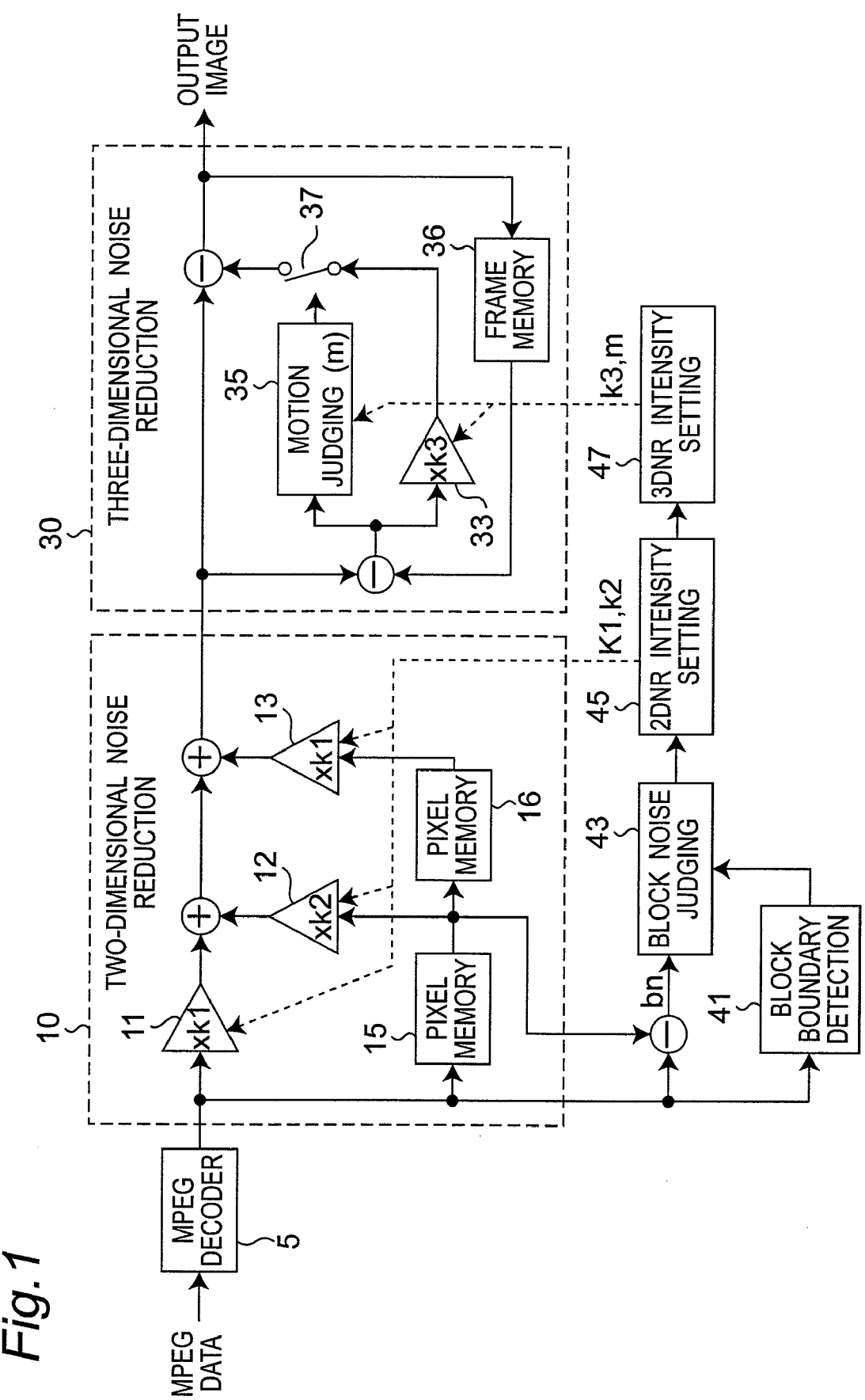
FIG. 1 is a block diagram of a noise reduction device according to the first embodiment of the invention.

FIG. 1 is a block diagram of the noise reduction device according to the first embodiment of the invention. An MPEG decoder 5 receives and decodes an MPEG stream. The noise reduction device includes a two-dimensional noise reduction unit 10 for reducing plane noise occurring within an image (a frame), and a three-dimensional noise reduction unit 30 for reducing temporal noise occurring between images (frames) in the video signal decoded by the MPEG decoder 5.

The noise reduction device further includes a block boundary detector 41 for detecting the boundary of macro-blocks (hereinafter referred to as "blocks") of 8×8 pixels or 16×16 pixels, a block noise judging unit 43 for judging (detecting) quantity of block noise, a 2DNR intensity setting unit 45 for setting the noise reduction intensity in the two-dimensional noise reduction process (2DNR), and a 3DNR intensity setting unit 47 for setting the noise reduction intensity in the three-dimensional noise reduction process (3DNR).

The operation of the noise reduction device having such configuration is explained below.

The two-dimensional noise reduction unit 10 includes multipliers 11 to 13 and pixel memories 15 and 16. The two-dimensional noise reduction unit 10 receives three continuous pixels, and multiplies the pixel values of the first and last pixels by coefficient k1 by the multipliers 11 and 13, and multiplies the pixel value of the middle pixel by coefficient k2 by the multiplier 12, and sums up the multiplied pixel values, thereby removing the plane noise. Such noise reduction method is a general technique for reducing the plane noise occurring in the image. The values of coefficients k1 and k2 represents the intensity of noise reduction process. That means that, when the value of k2 is larger compared to k1, the intensity of the applied noise reduction process is smaller, and when the ratio of k1 to k2 is closer to 1, the intensity of the applied noise reduction process is larger. The values of coefficient k1 and k2 of the multipliers 11 to 13 are decided by a 2DNR intensity setting unit 45.

The three-dimensional noise reduction unit 30 includes a multiplier 33 for multiplying by coefficient k3, a motion judging unit 35 for detecting the motion of the image, and a frame memory 36. The three-dimensional noise reduction unit 30 applies a three-dimensional noise reduction process only to the region in the image which has no motion. The three-dimensional noise reduction unit 30 calculates the difference between the pixel of the frame presently entered and the pixel of a previous frame entered just before the presently entered frame and provided from the frame memory 36, and multiplies the difference by coefficient k3 by the multiplier 33. The three-dimensional noise reduction unit 30 subtracts the difference multiplied by coefficient k3 from the entered pixel value, and executes the noise reduction. Such noise reduction method is a general technique for reducing the temporal noise occurring in the image.

Figure 2:
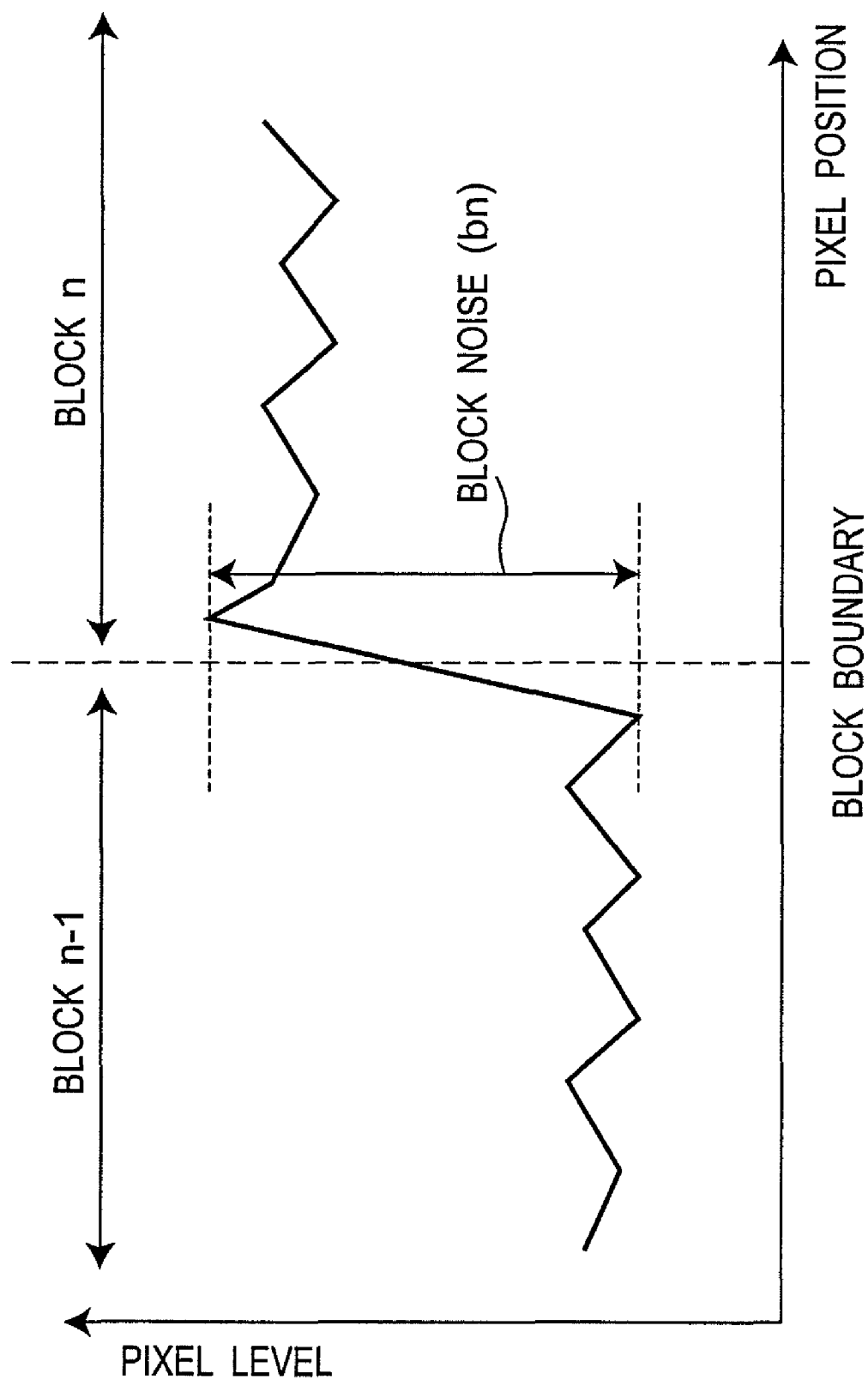
FIG. 2 is an explanatory diagram of block noise.

The block boundary detector 41 detects the boundary of blocks. The block noise judging unit 43 receives the detection result from the block boundary detector 41, and judges (detects) the quantity of block noise at the block boundary when the block boundary is detected. In this embodiment, the block noise judging unit 43 calculates the difference of pixel values before and after the block boundary as block noise (bn), as shown in FIG. 2. The 2DNR intensity setting unit 45 decides the values of coefficients k1 and k2 based on the size of block noise detected by the block noise judging unit 43. Table 1 shows the values of coefficients k1 and k2 set by the 2DNR intensity setting unit 45. In the example in Table 1, the intensity of 2DNR is divided in four stages (high, medium, low, off), and the values of coefficients k1 and k2 are determined in each stage.

TABLE 1

| Intensity of two-dimensional noise reduction | k1 | k2 |
| --- | --- | --- |
| High | 5/16 | 6/16 |
| Medium | 3/16 | 10/16 |

TABLE 1-continued

| Intensity of two-dimensional noise reduction | k1 | k2 |
|---|---|---|
| Low | 1/16 | 14/16 |
| off | 0 | 1 |

The 3DNR intensity setting unit 47 sets the intensity of noise reduction of the three-dimensional noise reduction unit 30 on the basis of the determination result of the 2DNR intensity setting unit 45. The intensity of noise reduction in the three-dimensional noise reduction unit 30 is determined by coefficient k3 and threshold m in the motion judging unit 35.

The motion judging unit 35 of the three-dimensional noise reduction unit 30 judges the quantity of the motion so as not to apply 3DNR to the image having large motion. Specifically, the motion judging unit 35 compares the difference of pixel values between frames with threshold m, and turns off the switch 37 so as not to apply 3DNR to the specific pixel when the difference is larger than the threshold m. Thus by increasing the value of threshold m, the frequency of applying of 3DNR becomes higher. That is, when it is desired to emphasize 3DNR, the value of threshold m is increased.

Table 2 shows the values of coefficient k3 and threshold m determined by the 3DNR intensity setting unit 47. In the example in Table 2, the intensity of 3DNR is divided in four stages (high, medium, low, off), and the values of k3 and m are determined in each stage. In Table 2, the intensity of three-dimensional noise reduction is varied by changing two parameters k3 and m, but the intensity of three-dimensional noise reduction may be varied by changing either one of the parameters k3 and m.

TABLE 2

| Intensity of three-dimensional noise reduction | k3 | m |
|---|---|---|
| off | 0 | 0 |
| Low | 1/8 | 1 |
| Medium | 1/6 | 2 |
| High | 1/4 | 3 |

As explained in the background art, if 2DNR is emphasized in order to reduce block noise, the image is deteriorated in high frequency range, and the motion detection sensitivity is lowered in such image. As a result, the intensity of 3DNR tends to be stressed, and retained image noise is more likely to occur. In order to solve this problem, the present invention determines the intensity of 3DNR depending on the intensity of 2DNR.

More specifically, when applying 2DNR with high intensity of 2DNR, the intensity of 3DNR is made lowered. As a result, 3DNR is not intensified on the image with deteriorated high frequency range after 2DNR, and occurrence of retained image noise can be suppressed. On the other hand, when applying 2DNR with lowered intensity of 2DNR, 3DNR is applied with stressed intensity of 3DNR. As a result, 3DNR is intensified on the image which is not deteriorated so much in high frequency range even after 2DNR, thereby reducing the pulsing noise.

Table 3 shows the relation between the intensity of two-dimensional noise reduction and the intensity of three-dimensional noise reduction on block noise in the present embodiment.

TABLE 3

| Block noise (bn) | Intensity of two-dimensional noise reduction | Intensity of three-dimensional noise reduction |
|---|---|---|
| 8 < bn | High | off |
| 4 < bn ≦ 8 | Medium | Low |
| 2 < bn ≦ 4 | Low | Medium |
| bn ≦ 2 | off | High |

As shown in the table, as the block noise (bn) is smaller, the intensity of 2DNR is lowered, and the intensity of 3DNR is stressed. On the other hand, when the block noise (bn) is larger, the intensity of 2DNR is stressed, and the intensity of 3DNR is lowered. Thus, when the intensity of noise reduction is varied depending on the block noise, the intensity is varied in opposite direction in 2DNR and 3DNR. As a result, it is possible to suppress retained image noise which occurs by applying intensified 3DNR to the image which is deteriorated in high frequency range after 2DNR, and to apply 3DNR effectively only to the image which is not deteriorated in high frequency range, so that the pulsing noise can be reduced and noise reduction achieving excellent visual recognition is realized.

Second Embodiment

Video information recorded in DVD includes a film material and a video material. The film material is video information of images of the film such as movie film recorded at 24 frames/second being converted and into images of 60 fields/second (telecine conversion) and recorded. The video material is video information recorded at 60 fields/second.

Generally, the video signal of the film material has lower dynamic range as compared with the video signal of the video material, but can express the detail with a slight difference in signal levels. That is, the video signal of the film material has characteristics in that, as compared with the video signal of the video material, the motion is less likely to be detected and that the coding noise is more obvious. The video signal of the video material has high contrast, and thus the motion can be detected appropriately in the image of the video material so that adaptive process of filter intensity acts effectively. Hence, 3DNR can reduce the noise from the image of the video material appropriately without causing retained image noise.

However, in the video signal of the film material, as mentioned above, the motion is not detected easily. Hence, since the motion is not detected appropriately, retained image noise may occur due to 3DNR process. Further, as mentioned above, since the video signal of the film material represents the detail with a slight difference in signal levels, the noise made by compression coding in the video signal of the film material is clearly visible even if it is very slight, and causes the image quality to deteriorate.

The present embodiment describes a noise reduction device for applying 2DNR and 3DNR properly to the video signal of the film material (telecine converted video signal) to suppress deterioration of image quality.

The noise reduction device of the present embodiment detects whether the video signal is telecine converted or not (image of film material or not). When it is a telecine converted video signal, The noise reduction device performs control to emphasize noise detection sensitivity of two-dimensional noise reduction process (2DNR) and emphasize motion detection sensitivity of three-dimensional noise reduction process (3DNR). As a result, even in the image of the film material, the motion is detected appropriately and excessive 3DNR is prevented, so that occurrence of retained image noise by 3DNR can be suppressed. Further, in 2DNR on the film material, the noise due to compression coding can be more securely reduced, and the deterioration of the image quality can be suppressed.

Figure 3:
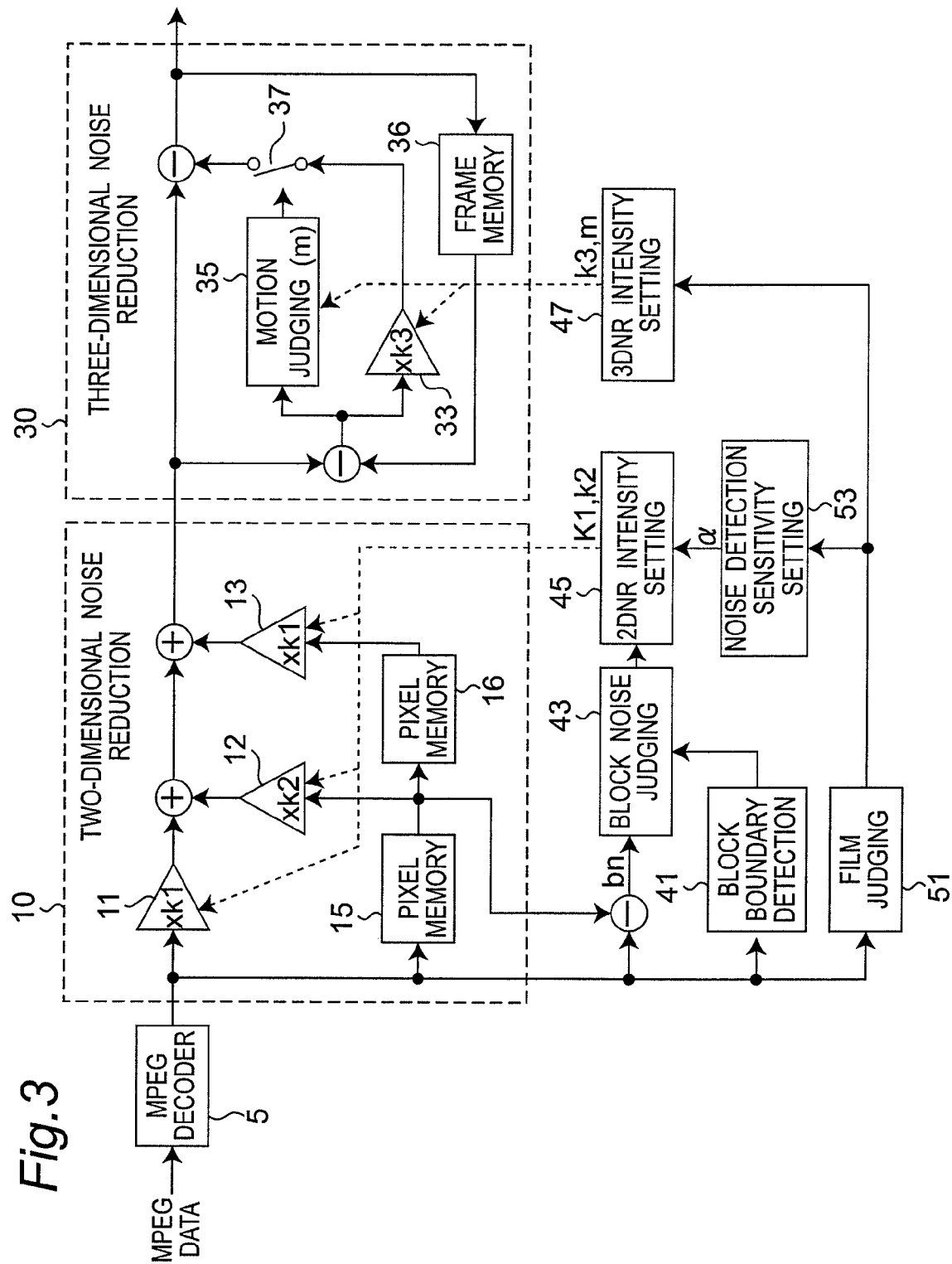
FIG. 3 is a block diagram of a noise reduction device according to the second embodiment of the invention.

FIG. 3 is a block diagram of the noise reduction device of the present embodiment. The noise reduction device of the present embodiment includes a film judging unit 51 for judging whether the video signal (video source) is film material or video material, and a noise detection sensitivity determination unit 53 for determining the noise detection sensitivity of the 2DNR intensity setting unit 45, in addition to the configuration of the noise reduction device of the first embodiment.

The operation of the noise reduction device having such configuration is explained below. The function blocks of the noise reduction device of the present embodiment which are the same as those of the first embodiment operate basically in the same manner as those of the first embodiment. Only the different points from the first embodiment are explained below.

In the present embodiment, the two-dimensional noise reduction process is executed before the three-dimensional noise reduction process, but the sequence of noise reduction processes may be reversed.

The film judging unit 51 judges whether the image data decoded by the MPEG decoder 5 is film material or video material. The detail of the film judging unit 51 is described later.

The 2DNR intensity setting unit 45 sets values of coefficients k1 and k2 according to a parameter α for providing the sensitivity determined by the noise detection sensitivity determination unit 53 and block noise quantity bn judged by the block noise judging unit 43. Table 4 shows an example of relation between the block noise and coefficients k1 and k2 set by the 2DNR intensity setting unit 45. In the example in Table 4, the range of block noise is divided into four stages, and the intensity of 2DNR is set in four stages (high, medium, low, off) in each stage. The range (width) of each stage of block noise varies on parameter α. As the value of parameter α is decreased, the range (width) of each stage becomes smaller, so that it becomes easier to detect the block noise. This means that the detection sensitivity of block noise becomes higher. Increase of the value of parameter α widens the range (width) of each stage so that it becomes harder to detect the block noise. This means that the detection sensitivity of block noise becomes lower.

TABLE 4

| Block noise (bn) | Intensity of two-dimensional noise reduction | k1 | k2 |
| --- | --- | --- | --- |
| 4α < bn | High | 5/16 | 6/16 |
| 2α < bn ≦ 4α | Medium | 3/16 | 10/16 |
| α < bn ≦ 2α | Low | 1/16 | 14/16 |
| bn ≦ α | off | 0 | 1 |

(Note: α is a parameter for determining the detection sensitivity of block noise.)

The parameter α which is a parameter for determining the detection sensitivity of block noise is determined by the noise detection sensitivity determination unit 53. The noise detection sensitivity determination unit 53 determines the value of parameter α on the basis of the judging result by the film judging unit 51. Specifically, the noise detection sensitivity determination unit 53 determines the value of parameter α, so that the detection sensitivity of block noise when the video signal is judged to be film material by the film judging unit 51 is higher than that when judged to be video material (see Table 5). That is, when the video signal is judged to be film material, the value of parameter α is set to a smaller value than that when judged to be video material.

TABLE 5

|  | Block noise detection sensitivity | Motion detection sensitivity |
| --- | --- | --- |
| Film material | High (α = small) | High |
| Video material | Low (α = large) | Low |

The motion judging unit 35 of the three-dimensional noise reduction unit 30 judges the quantity of motion so as to skip 3DNR on the image having large motion. Specifically, the motion judging unit 35 compares the difference of pixel values between frames and threshold m, and judges that the motion is large when the difference is larger than threshold m and turns off the switch 37 so as not to apply 3DNR to the pixel. By decreasing the value of threshold m, the frequency of being judged that the motion is large becomes higher. That is, decreasing of the value of threshold m means that the motion detection sensitivity is set higher. The value of threshold m is determined by the 3DNR intensity setting unit 47.

The 3DNR intensity setting unit 47 sets the motion detection sensitivity, that is, the threshold m, on the basis of the judging result of the film judging unit 51. Specifically, the 3DNR intensity setting unit 47 sets the motion detection sensitivity so that the motion detection sensitivity when the video signal is judged to be film material by the film judging unit 51 is higher than that when judged to be video material (see Table 5). That is, when the video signal is judged to be film material by the film judging unit 51, the value of threshold m is set to a smaller value than that when judged to be video material. Table 6 shows the relation between the motion detection sensitivity and the parameter by the 3DNR intensity setting unit 47. In Table 6, the value of parameter k3 is constant, but the value of k3 for film material may be set smaller than the value for video material.

TABLE 6

|  | Motion detection sensitivity | 3DNR parameter | |
| --- | --- | --- | --- |
|  |  | k3 | m |
| Film material | High | 1/4 | 2 |
| Video material | Low | 1/4 | 4 |

Table 7 shows an example of relation among noise detection sensitivity and intensity in 2DNR, and motion detection sensitivity in 3DNR. In the example in the table, for the film material, parameter α in 2DNR is set at 1, threshold m in 3DNR is set at 2, and for the video material, parameter α in 2DNR is set at 2 and threshold m in 3DNR is set at 4. As a result the block noise detection sensitivity of 2DNR and motion detection sensitivity of 3DNR for the film material are set higher than the detection sensitivities for the video material. In this manner, setting the motion detection sensitivity higher for the film material higher than that for the video material allows the motion to be detected more easily in the film material, so that excessive 3DNR can be suppressed and occurrence of retained image noise by 3DNR can be suppressed. Further setting the block noise detection sensitivity for the film material higher than that for the video material allows block noise to be decreased more securely by 2DNR on the film material, so that deterioration of image quality can be suppressed.

TABLE 7

|  | Two-dimensional noise reduction | | | Three-dimensional noise reduction |
| --- | --- | --- | --- | --- |
|  | Block noise detection sensitivity | Block noise (bn) | Intensity | Motion detection sensitivity |
| Film material | High ($\alpha = 1$) | $4 < bn$ | High | High ($m = 2$) |
|  |  | $2 < bn \leq 4$ | Medium |  |
|  |  | $1 < bn \leq 2$ | Low |  |
|  |  | $bn \leq 1$ | off |  |
| Video material | Low ($\alpha = 2$) | $8 < bn$ | High | Low ($m = 4$) |
|  |  | $4 < bn \leq 8$ | Medium |  |
|  |  | $2 < bn \leq 4$ | Low |  |
|  |  | $bn \leq 2$ | off |  |

The detail of the film judging unit 51 is explained below.

The film judging unit 51 detects the conversion pattern in telecine conversion by detecting a copy field based on the size of difference between frames or the like, and judges whether it is the film material or the video material. Prior to detailed description of structure and operation of the film judging unit, the "telecine conversion" for converting the film material of frame rate of 24 Hz to interlace video signal of 60 Hz is explained. The telecine conversion is also known as "2-3 conversion" or "2-3 pull down".

Figure 4:
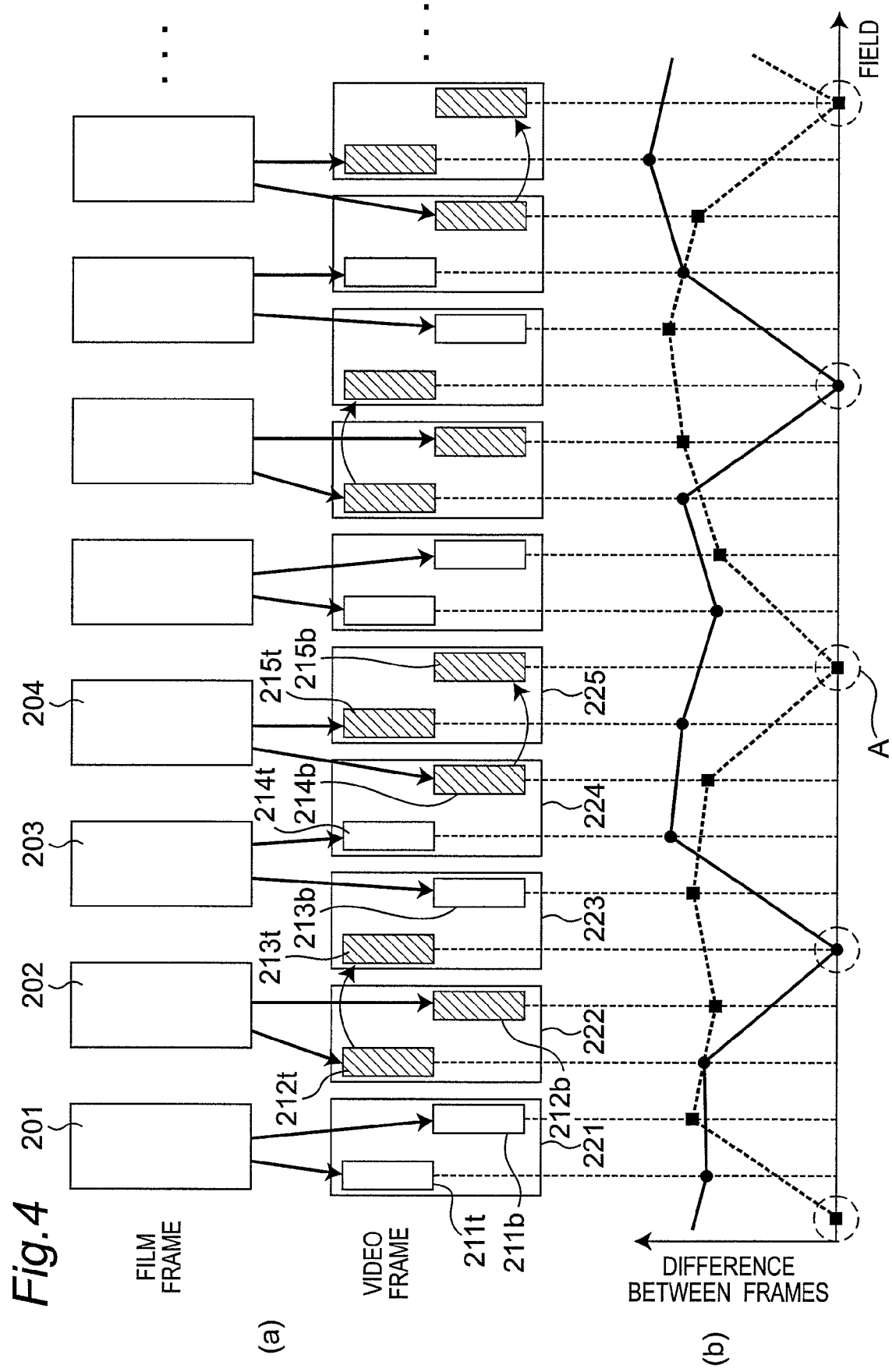
FIG. 4(a) is an explanatory diagram of telecine conversion for converting film frames into video frames.
FIG. 4(b) is an explanatory diagram of transition pattern of differential value between frames.

The telecine conversion repeats alternately conversion of one film frame into two video fields of interlace signal, and conversion one film frame into three video fields. FIG. 4 (a) shows a telecine conversion. The telecine conversion converts four film frames 201, 202, 203 and 204 into five video frames in the interlace signal 221, 222, 223, 224 and 225 (ten video fields). Specifically, the odd-number lines of first film frame 201 are set to a top field 211t of the first video frame 221, and the even-number lines are set to a bottom field 211b. Similarly, the odd-number lines of the second film frame 202 are set to a top field 212t of the second video frame 222, and the even-number lines are set to a bottom field 212b. Herein, the odd-number lines of the second frame 202 are set to a top field 213t of the third video frame 223. That is, the top field 212t of the second video frame 222 is identical to the top field 213t of the third video frame 223. Such top fields 212t and 213t are called "copy fields". Thus, the second film frame 202 is converted into three video fields.

The even-number lines of the third film frame 203 are set to a bottom field 213b of the video frame 223, and the odd-number lines are set to a top field 214t of the fourth video frame 224. Similarly, the even-number lines of the fourth film frame 204 are set to a bottom field 214b of the fourth video frame 224, and the odd-number lines are set to a top field 215t of the fifth video frame 225. Further, the even-number lines of the fourth film frame 204 are set to a bottom field 215b of the fifth video frame 225. That is, the bottom fields 214b and 215b are copy fields, and the fourth film frame 204 is converted into three fields.

Thus, in the telecine conversion, the conversion of four frames in the film into five video frames (10 fields) in the interlace video signal is repeated.

Figure 5:
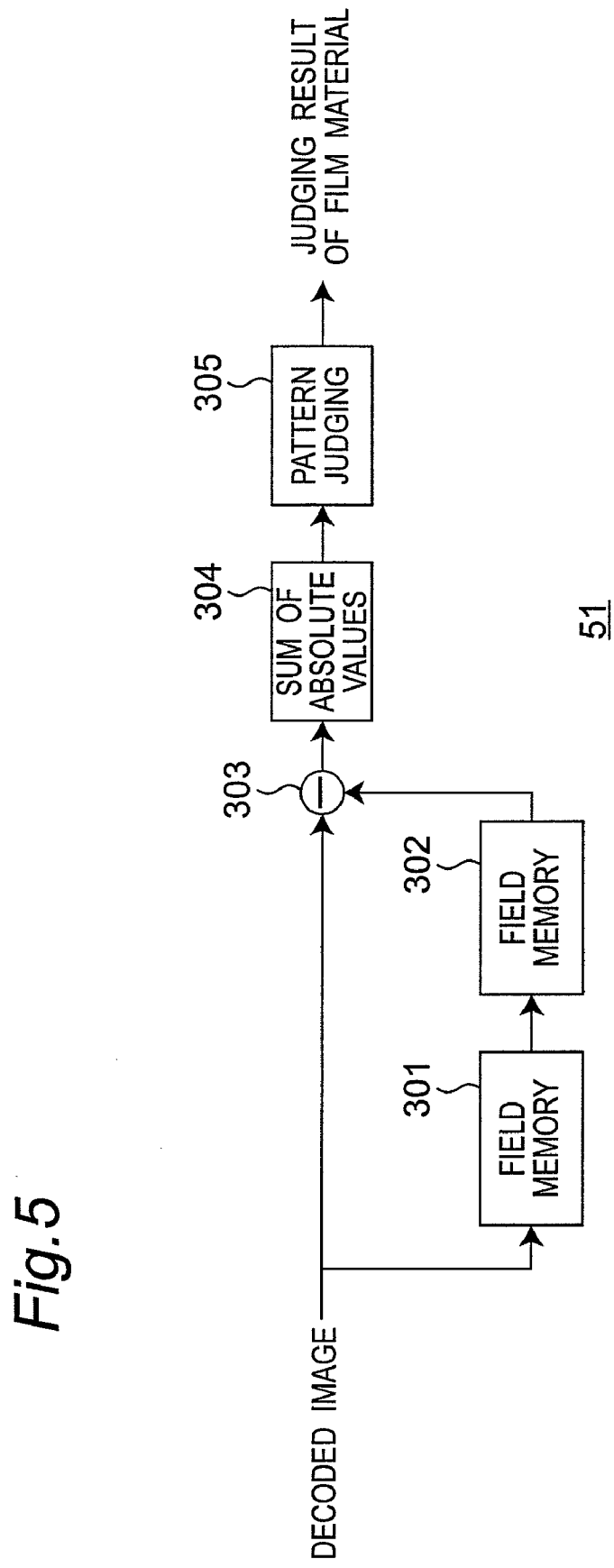
FIG. 5 is a block diagram of an example of film judging unit.

The structure and operation of the film judging unit 51 are specifically described below. FIG. 5 shows an example of the film judging unit 51. The film judging unit 51 includes a first field memory 301, a second field memory 302, a subtractor 303, an absolute differential value summing unit 304, and a pattern judging unit 305.

The film judging unit 51 receives the decoded image from the MPEG decoder 5. The received decoded image is stored in the first field memory 301, and then stored in the second field memory 302. The output image of the second field memory 302 is an image delayed by a period of one frame from the received image. The subtractor 303 calculates the difference between the received image and the field image delayed by a period of one frame. The absolute differential value summing unit 304 sums up the differential values (absolute values) obtained from the subtractor 303 and calculates the difference between frames in each field. The pattern judging unit 305 compares a time transition pattern of the differential value between frames in each field, with a differential transition pattern (reference pattern) for five frames which are telecine converted. The pattern judging unit 305 judges that the received video signal is a telecine converted signal, that is, film material, when both the patterns are matched.

The foregoing judging process utilizes the periodicity that telecine conversion is made in a period of five frames. For example, there is a copy field in the top field or in the bottom field, in five frame periods. Thus, there is a time transition pattern of differential values in which the differential value between frames becomes the minimum in synchronism with the five frame period. For example, FIG. 4 (b) shows a transition pattern of differential value between frames. In FIG. 4 (b), the solid line denotes the differential value between frames of the top field, and the broken line indicates the differential value between frames of the bottom field. It is known from FIG. 4 (b) that the local minimum A of the differential value between frames appears periodically at the timing corresponding to the difference between the copy fields.

The detecting method of film material is not limited to the method explained above. For example, it may be detected on the basis of the information described in the coded data. In the MPEG coding method, top_field_first flag and repeat_first_field flag are described in a coded stream to represent the telecine conversion pattern. When the top_field_first flag is "1", the top field is output first, and then the bottom field is output. When the repeat_first_field flag is "1", the field output previously is repeated after the field output later. This means that the field is a copy field.

In the case of video material, the top_field_first flag is always "1", and the repeat_first_field flag is always "0". On the other hand, in the case of film material, since the flags vary depending on the telecine conversion pattern, detection of the values of these flags makes it possible to detect a telecine converted video signal, that is, a signal to be a film material.

In the example above, the film judging unit 51 determines the type of video source by judging whether a video signal is a telecine converted image or not. In other method, the film judging unit 51 may detect a frame frequency of a video signal and judge that the video signal is film material when the frame frequency is 24 Hz. Alternatively, the film judging unit 51 may judge whether the video signal is progressive signal or interlace signal, and judge that the video signal is film material when it is progressive signal.

As explained herein, the noise reduction device of the present embodiment enhances the detection sensitivity of block noise in two-dimensional noise reduction (2DNR) and also enhances the motion detection sensitivity in three-dimensional noise reduction (3DNR), when the video signal is film material. As a result, in two-dimensional noise reduction (2DNR), block noise can be sufficiently reduced, and the motion can be detected sufficiently in the film material, so that an appropriate 3DNR is enabled and retained image noise can be reduced.

That is, according to the present embodiment, in the case of the video signal of film material (telecine converted video signal), the motion detection sensitivity of three-dimensional noise reduction process is enhanced, so that the motion can be detected appropriately and the coding noise can be eliminated effectively while suppressing the retained image noise. Also in the case of the video signal of film material (telecine converted video signal), the detection sensitivity of coding noise in two-dimensional noise reduction process is enhanced, so that the two-dimensional noise reduction process is appropriately processed on a slight coding noise and an image of high quality with little coding noise is obtained.

Third Embodiment

The present embodiment describes a noise reduction device capable of realizing a noise reduction determination method by combining the determination method of the noise reduction intensity disclosed in the first embodiment with the determination method of noise reduction intensity disclosed in the second embodiment.

Figure 6:
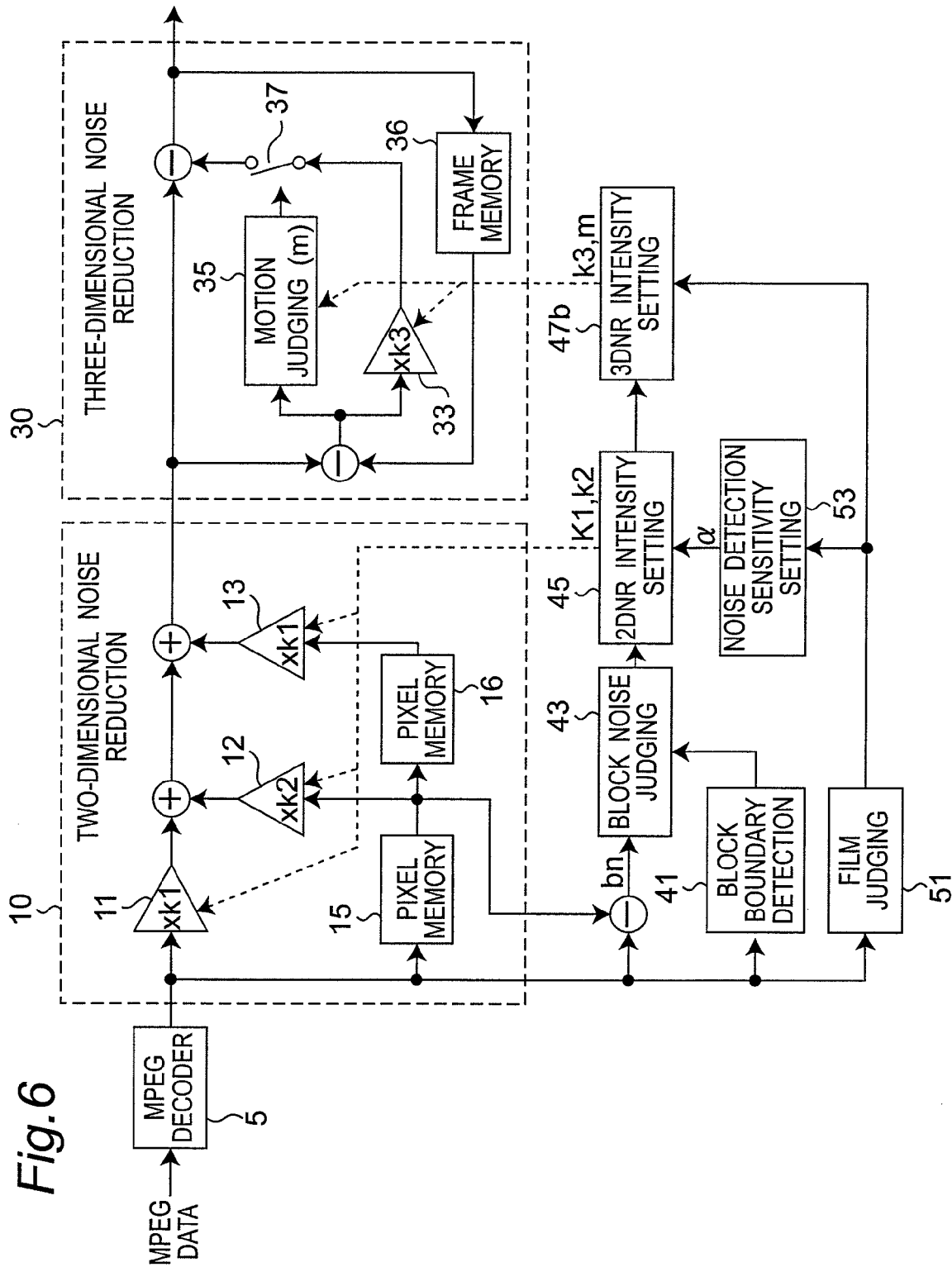
FIG. 6 is a block diagram of a noise reduction device according to the third embodiment of the invention.

FIG. 6 is a block diagram of the noise reduction device according to the third embodiment of the invention. The noise reduction device of the present embodiment is different from the second embodiment in the operation of the 3DNR intensity setting unit 47. The 3DNR intensity setting unit 47b sets the intensity of noise reduction of the three-dimensional noise reduction unit 30 on the basis of the setting result by the 2DNR intensity setting unit 45 and the judging result by the film judging unit 51. Specifically, the 3DNR intensity setting unit 47b sets the motion detection sensitivity, so that the intensity of three-dimensional noise reduction process (3DNR) becomes lower when the two-dimensional noise reduction process (2DNR) becomes higher, and the intensity of three-dimensional noise reduction process becomes higher when the two-dimensional noise reduction process becomes lower. Further, when a video signal is a telecine converted video signal, the 3DNR intensity setting unit 47b sets the motion detection sensitivity of three-dimensional noise reduction process (3DNR) higher than that applied for a video signal other than the telecine converted signal.

Table 8 shows the relation of noise reduction intensity by 2DNR intensity setting unit 45 and 3DNR intensity setting unit 47b in the noise reduction device of the present embodiment.

TABLE 8

| | Two-dimensional noise reduction | | | Three-dimensional noise reduction | |
|---|---|---|---|---|---|
| | Block noise detection sensitivity | Block noise (bn) | Intensity | Motion detection sensitivity (m) | Intensity (k3) |
| Film material | High ($\alpha = 1$) | $4 < bn$ | High | High ($m = 2$) | off ($k3 = 0$) |
| | | $2 < bn \leq 4$ | Medium | | Low ($k3 = 1/8$) |
| | | $1 < bn \leq 2$ | Low | | Medium ($k3 = 1/6$) |
| | | $bn \leq 1$ | off | | High ($k3 = 1/4$) |
| Video material | Low ($\alpha = 2$) | $8 < bn$ | High | Low ($m = 4$) | off ($k3 = 0$) |
| | | $4 < bn \leq 8$ | Medium | | Low ($k3 = 1/8$) |
| | | $2 < bn \leq 4$ | Low | | Medium ($k3 = 1/6$) |
| | | $bn \leq 2$ | off | | High ($k3 = 1/4$) |

As understood from Table 8, in the present embodiment, similarly to the first embodiment, as the block noise (bn) is smaller, the intensity of 2DNR becomes lower, while the intensity of 3DNR is stressed more. Further, similarly to the second embodiment, when the video signal is film material, the detection sensitivity of block noise in two-dimensional noise reduction (2DNR) is set higher than that applied when the video signal is video material, and the motion detection sensitivity in three-dimensional noise reduction (3DNR) is also enhanced more. As a result, the noise reduction device of the embodiment brings about the effects obtained in the first embodiment as well as the effects obtained in the second embodiment.

The noise reduction device and noise reduction method of the invention controls the noise reduction intensity of 3DNR according to the noise reduction intensity of 2DNR, so that noise reduction excellent in visual recognition can be realized. Therefore The noise reduction device and noise reduction method of the invention can be applied to a recording and reproducing apparatus required for recording and reproducing high quality image, and/or to application in which images of high quality can be transmitted and reproduced in a transmission path with a limited transmission rate.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Applications, No. 2007-124239 and No. 2007-124240, filed on May 9, 2007, of which contents are expressly incorporated herein by reference.

What is claimed is:

1. A noise reduction device for reducing noise of a compression coded video signal, comprising:
   a two-dimensional noise reducing unit operable to reduce noise by arithmetic processing within an image;
   a three-dimensional noise reducing unit operable to receive a video signal processed by the two-dimensional noise reducing unit and to reduce noise by arithmetic processing between images;
   a first noise reduction intensity setting unit operable to set noise reduction intensity of the two-dimensional noise reducing unit;
   a second noise reduction intensity setting unit operable to set noise reduction intensity of the three-dimensional noise reducing unit, and
   a video source judging unit operable to judge whether the video signal is film material or not film material,
   wherein the second noise reduction intensity setting unit sets the noise reduction intensity of the three-dimensional noise reducing unit, so that the noise reduction intensity of the three-dimensional noise reducing unit becomes lower as the noise reduction intensity of the two-dimensional noise reducing unit becomes higher, the three-dimensional noise reducing unit detects motion within the image, and reduces the noise by arithmetic processing between images when an amount of the detected motion is equal to or smaller than a predetermined value, and the second noise reduction intensity setting unit receives a judging result from the video source judging unit, and sets motion detection sensitivity of the three-dimensional noise reducing unit, which is used when the video signal is film material, higher than that used when the video signal is not film material.

2. The noise reduction device of claim 1, further comprising:

a noise detecting unit operable to detect coding noise of the video signal, wherein the first noise reduction intensity setting unit changes the noise reduction intensity of the two-dimensional noise reducing unit according to the quantity of the coding noise detected by the noise detecting unit.

3. The noise reduction device of claim 1, further comprising:

a decoder operable to decode the compression coded video signal.

4. The noise reduction device of claim 1, wherein the compression coded video signal is an MPEG stream.

5. The noise reduction device of claim 4, wherein the two-dimensional noise reducing unit reduces block noise.

6. The noise reduction device of claim 1, wherein the two-dimensional noise reducing unit detects coding noise, and changes the noise reduction intensity according to an amount of the coding noise, and the video signal noise reduction device further comprises:

a sensitivity setting unit operable to set the detection sensitivity of coding noise in the two-dimensional noise reducing unit, and wherein the sensitivity setting means sets coding noise detection sensitivity of the two-dimensional noise reducing unit, which is used when the video signal is film material, higher than that used when the video signal is not film material, based on the judging result of the video source judging unit.

7. The noise reduction device of claim 1, wherein the video source judging unit judges whether the video signal is a telecine converted image or not a telecine converted image, and judges that the video signal is film material when the video signal is a telecine converted image.

8. The noise reduction device of claim 1, wherein the video source judging unit detects a frame frequency of the video signal, and judges that the video signal is film material when the frame frequency is 24 Hz.

9. The noise reduction device of claim 1, wherein the video source judging unit judges whether the video signal is a progressive signal or an interlace signal, and judges that the video signal is film material when the video signal is a progressive signal.

10. A noise reduction method for reducing noise of a compression coded video signal, comprising:

executing a two-dimensional noise reducing process for reducing noise by arithmetic processing within an image;

executing a three-dimensional noise reducing process for receiving the video signal processed by the two-dimensional noise reducing process and reducing noise by arithmetic processing between images, setting the noise reduction intensity of the three-dimensional noise reducing process, so that the noise reduction intensity of the three-dimensional noise reducing process becomes lower as the noise reduction intensity of the two-dimensional noise reducing process becomes higher, wherein the executing of the three-dimensional noise reducing process includes detecting the motion within the image, and reducing the noise by arithmetic processing done between images when an amount of the motion is equal to or smaller than a predetermined value, and wherein the noise reduction method further comprises:

judging whether the video signal is film material or not film material, and setting motion detection sensitivity in the three-dimensional noise reduction process, which is used when the video signal is a film material, higher than that used when the video signal is not film material.

11. The noise reduction method of claim 10, wherein the executing a two-dimensional noise reducing process includes detecting the coding noise, and changing the noise reduction intensity according to an amount of the coding noise, and the noise reduction method further comprises:

setting the coding noise detection sensitivity in the two-dimensional noise reduction process, which is used when the video signal is film material, higher than that used when the video signal is not film material.

* * * * *